July 20, 1965

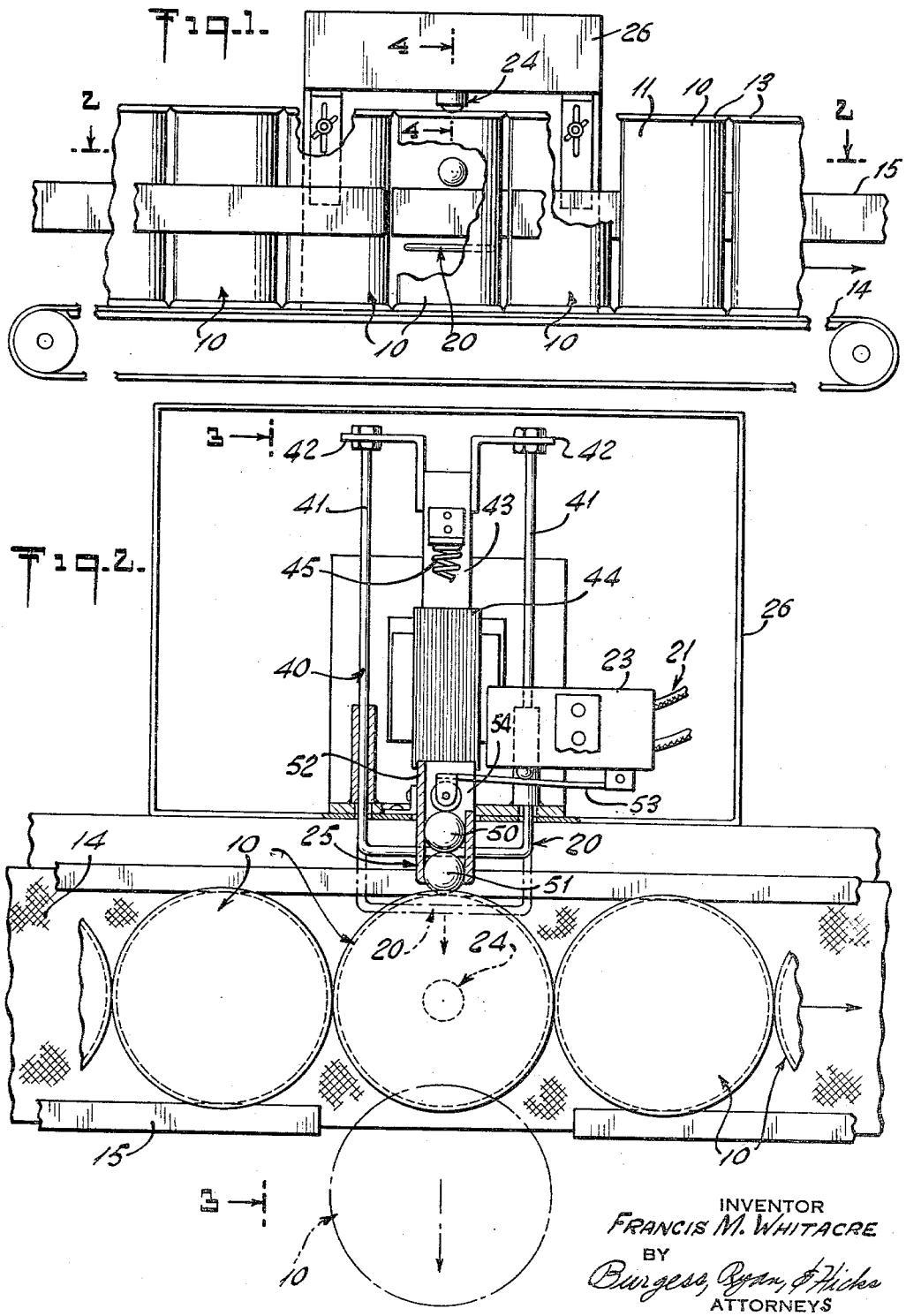

F. M. WHITACRE 3,195,724

MACHINE FOR TESTING SEALED CANS AND FOR
REJECTING DEFECTIVE CANS

Filed Aug. 22, 1961

INVENTOR
FRANCIS M. WHITACRE
BY
Burgess, Ryan, & Hicks
ATTORNEYS

United States Patent Office 3,195,724
Patented July 20, 1965

3,195,724
MACHINE FOR TESTING SEALED CANS AND FOR REJECTING DEFECTIVE CANS
Francis M. Whitacre, 148 Shoreview Road, Manhasset, N.Y.
Filed Aug. 22, 1961, Ser. No. 133,092
2 Claims. (Cl. 209—88)

The present invention relates to a machine for testing sealed cans containing commodities while these cans are on a conveyor line to determine their internal pressure conditions and for automatically ejecting those cans from the conveyor line which do not come up to pressure requirements.

Commodities very often are canned under pressure conditions to preserve them against deterioration or to impart effervescence or other desirable qualities to them. For example, there are commodities which are sealably packaged in cans under air or inert gas pressure, such as beer, tennis balls, etc., and there are commodities which are packaged in cans under vacuum, as for example, coffee, nuts, candies, etc. These cans usually have top flexible metal walls and raised rims around these walls; the extent to which these walls are flexed inwardly or outwardly is a measure of the pressure conditions in said cans. For example, a can which is under pressure will have its top wall bulged outwardly, and if the wall does not bulge outwardly beyond a predetermined extent, the deficiency indicates a defective can which should be ejected from the conveyor line. Similarly, in a vacuumized can, the top wall will flex inwardly, and if the extent of inward flexing is below a predetermined value, this insufficiency indicates a defective can which should also be ejected from the conveyor line.

In the type of pressure treated can described, the presence of the rim poses a difficult problem. Since this rim is usually raised above the end wall of the can, whether it is pressurized or vacuumized, any sensing device located in the path of travel of the cans must avoid the effect of the raised rim. This requires either a complicated form of sealing device, or requires the stopping of each can as it reaches the sensing station and the lowering of the sensing head down upon the immobilized can. This requirement delays seriously the progress of the conveyor line.

One object of the present invention is to provide a new and improved sensitive quickly response machine for testing cans moving continuously in a conveyor line to determine their internal pressure conditions and for automatically ejecting from the conveyor line any tested can which pressurewise does not come up to requirements, without interrupting the conveyor movement of the can, even when this movement is very rapid.

In accordance with certain features of the present invention, there is provided a sensing device in the path of travel of the top of the cans for sensing the extent of flexing of the top walls of the cans and a first switch in a can ejector circuit controlled by the action of said sensing device. The raised rims around the top can walls also activate the sensing device before and after the centers of the top walls of the cans reach this sensing device and this activation closes this switch. However, the can ejector circuit remains open and inactive because of the presence of a second normally open switch in said circuit in series with the first switch.

Means are provided for closing the second switch only when the center of the top wall of a can is in position to be tested by the sensing device. To that end, means are provided for sensing the presence of a can at the station where the extent of flexing of the top wall of the can is being tested. In the specific form of the invention illustrated, there is provided for this purpose a target device in the path of movement of the side walls of the cans controlling the second switch in the can ejector circuit and designed and located to be tripped by these side walls as the centers of the top walls of the cans reach the top wall sensing device and to close this second switch. Since this second switch is only closed when the centers of the top walls of the cans are being sensed, the opening and closing of the can ejector circuit will depend solely on the extent to which the top walls of the cans are flexed. Thus, the problem of the rims and their effect on the sensing device is successfully met.

As another feature of the present invention, the can testing and ejecting machine is applicable to pressurized and vacuumized cans, the machine being easily converted to operate for either type of cans by switchover circuit means without substantially disturbing the mechanical aspects of the machine.

Various other objects, features and advantages of the present invention are apparent from the following description and from the accompanying drawings, in which FIG. 1 is a side elevation of the can testing and ejecting machine embodying the present invention and shown with a conveyor line of cans moving into the field of action of said machine;

FIG. 2 is a top plan view of the can testing and ejecting machine taken on lines 2—2 of FIGS. 1 and 3;

FIG. 6 is a diagram of a form of electrical system associated with the can testing and ejecting machine; and FIG. 7 is a diagram of a similar electrical system associated with the can testing and ejecting machine.

Figure 3:
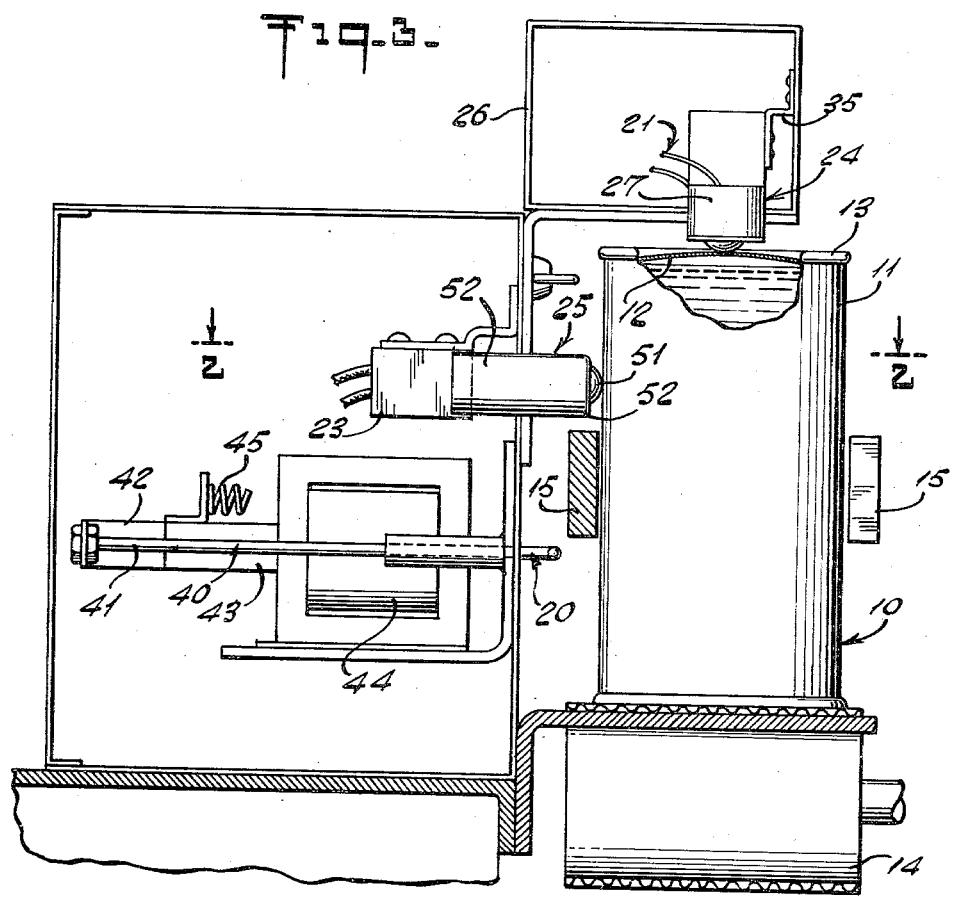
FIG. 3 is a section of the can testing and ejecting machine taken on lines 3—3 of FIG. 2.

Referring to the FIGS 1–6 of the drawings, the can testing and ejecting machine of the present invention is shown for the purposes of illustration operating on a succession of pressurized sealed beer cans 10, but it must be understood that the machine will operate on any sealed cans containing other commodities, as long as they have top walls whcih are flexible enough to bulge inwardly or outwardly according to the pressure conditions therein. Each can 10 has a cylindrical side or peripheral wall 11 and a top or end wall 12 surrounded by a raised rim 13, by which this top wall is secured to the side wall.

The can testing and ejecting machine comprises a conveyor system 14 for continuously moving the cans in succession past the sensing and target devices of said machine. Guides 15 closely flanking the cans 10 in their movement by the conveyor system 14 serve to assure proper positioning of the cans 10 with respect to the sensing and target devices as these cans move past these devices.

A can ejector device 20 is provided for ejecting a can 10 from the conveyor line when the can is not properly pressurized. This can ejector device 20 is controlled by an electric circuit 21 (FIGS. 2 and 6) containing two switches 22 and 23 in series. The switch 22 is controlled by a device 24 for sensing the extent of bulge in the endwall 12 of the can 10 and the other switch 23 is controlled by a device 25 for sensing the presence of a can at the station testing the bulge in said endwall shown in the form of a target device in the path of conveyor movement of the cans 10. Both of these switches 22 and 23 must be closed to activate the can ejector device 20.

The sensing device 24 is located over the center line of the rows of cans 10 on the conveyor line and is secured to a frame 26 of the machine. This sensing device 24 comprises a housing 27 containing a sensing element 28 shown in the form of a spherical ball having a lower segment 30 projecting below a perforated retaining plate 31 which is secured to the lower end of said housing and which retains said sensing element partly in said housing.

Figure 4:
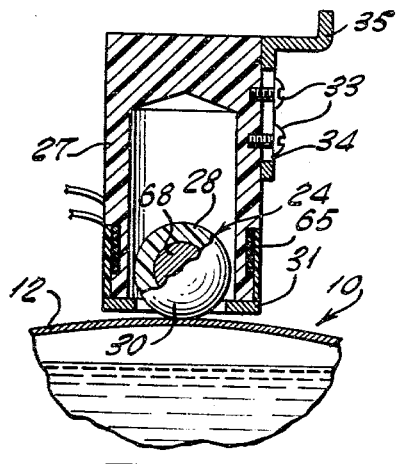
FIG. 4 is a section of the top wall can sensing device taken on lines 4—4 of FIG. 1 and shown in the process of sensing the center of the top of a properly pressurized can.
Figure 5:
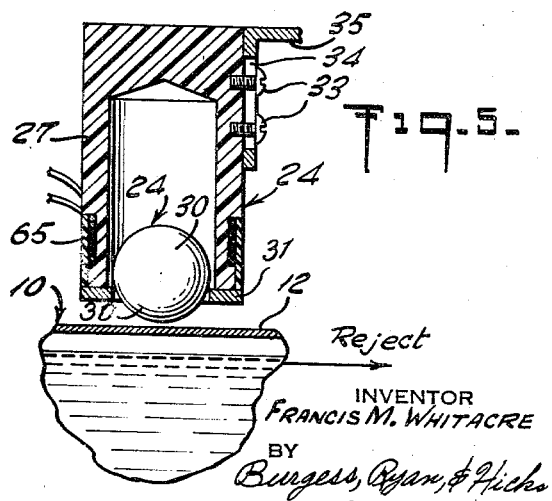
FIG. 5 is a section of the top wall can sensing device similar to that of FIG. 4 but showing the device sensing the center of the top wall of a can pressurized below requirements and therefore slated for ejection from the conveyor line.

The sensing element 28 is located on the center line of the row of moving cans 10 and its elevation is such as to engage the center of the top wall 12 of each can and to be raised by a bulging top wall 12 in a properly pressurized can as shown in FIG. 4. In the case of a can 10 which is not sufficiently pressurized and which, therefore, is "flat," the sensing element 28 will drop to its lowermost position limited by the retaining plate 31, as shown in FIG. 5. The proper elevational adjustment of the sensing element 28 is attained through screws 33 passing through an elongated slot 34 in a bracket 35 mounting the housing 27 on the frame 26.

When the sensing element 28 is not engaged by the top walls of the cans 10, the sensing element is in the lowermost position shown in FIG. 5, and in this position, the switch 22 controlled by this element is closed. This condition may be due to the fact that no cans 10 are being moved along the conveyor line or due to the fact that the can passing underneath the sensing element 28 is a flat one. If no cans 10 are moving along the conveyor line, the target device 25 is not being tripped by the cans, and the switch 23 controlled by the target device is in open position. Therefore, under these conditions, notwithstanding the closing of the switch 22, the can ejector device 20 is not activated.

When cans 10 are moving on the conveyor line, the properly pressurized cans with properly bulging end walls 12 contacting the sensing element 28 will raise said element into position to open the switch 22 as shown in FIG. 4. The sensing device 24 and target device 25 are arranged so that the target device is tripped by a can 10 as the center of its end wall 12 is directly in contact and centered with respect to the sensing element 28. The tripping of the target device 25 will close the switch 23, but since the switch 22 in series therewith has been opened by the raising of the sensing element 28 into position shown in FIG. 4, the can ejector circuit 21 is not closed and the can ejector device 20 remains inactive. If the can 10 tripping the target device 25 is a "flat" one, the sensing element 28 dropping to the position shown in FIG. 5, will close the switch 22, and the closing of the switches 22 and 23 at the same time will instantly actuate the can ejector device 20 and eject the faulty can from the conveyor line, while the other cans in the line continue their transit.

The can ejector device 20 comprises a pusher 40 in the form of a U-shaped wire or rod on one side of the line of travel of the cans 10 having arms 41 secured to brackets 42 affixed to a plunger 43 forming the core of a solenoid 44 in the can ejector circuit 21. A spring 45 normally maintains the pusher 40 in withdrawn position shown in full lines in FIG. 2, in which position the cans 10 are free to move along the conveyor line. Upon closing of the can ejector circuit 21 in the manner described, the energization of the solenoid 44 will move the plunger 43 into the solenoid against the action of the spring 45, and this will move the can 10 directly in front out of line as shown in dot and dash lines in FIG. 2. The ejection of the faulty can 10 will immediately restore the target device 25 into position to open the switch 23 and will thereby deenergize the solenoid 44, so that the pusher 40 once actuated returns immediately into inoperative position shown in full lines in FIG. 2 under the action of the spring 45 and will remain in this position until the next can ejecting operation.

The target device 25 comprises a pair of spherical balls 50 and 51 in a housing 52, the inner ball 50 serving as a spacer and being engaged by the spring arm 53 of the switch 23 shown in the form of a microswitch mounted on one side of the solenoid 44, the outer ball 51 being normally projected by said spring arm partially out of said housing into the path of travel of the cans 10 and in position to be engaged by the peripheral walls 11 of the cans as these cans move successively into position directly opposite and centered with respect to the vertical plane of said balls, at the same time the sensing element 28 is feeling the centers of the top walls 12 of the cans.

The housing 52 is in the form of a cylindrical tube having an opening 54 in its side wall to permit the passage of the spring arm 53 therein with operating freedom, and its outer peripheral end section is crimped inwardly to form a seat for the ball 51 to retain the latter ball against complete ejection from the housing.

The switch 22 in the circuit 21 is controlled by a relay circuit 60 (FIG. 6) which comprises a Wheatstone bridge loop 61 having two equal resistances 62 and 63 and a variable resistance 64 for adjusting the sensitivity of the system connected in series in a closed circuit with an inductance coil 65 carried by the housing 27 around the path of movement of the sensing element 28. This loop 61 is energized from the secondary of a step-down transformer 66 having its primary connected to the main power line from which the circuit 21 is fed and is connected to the coil of a relay 67 controlling the switch 22 in said circuit. Also in the circuit 21 in series with the switch 22 is the switch 23 and the solenoid 44.

The sensing element 28 is of steel but may either have a core 68 (FIG. 4) of high permeability, such as a core of soft iron, as shown, or the sensing element may be entirely of steel but may have seated thereon a metal body of high permeability having a snug slide fit in the housing 27 and movable in said housing with the sensing element. The height of the inductance coil 65 is such in relation to the high permeable component 68 of the sensing element 28 as to change the inductance in said coil as the sensing element moves up or down, and to thereby control the amount of current passing through said coil. The resistances 62, 63 and 64 in the loop 61 are such, that when the sensing element 28 is in its lowermust position shown in FIG. 5, there is an imbalance in resistances in the control relay circuit 60, causing current to flow through the coil of the relay 67 and thereby closing the switch 22. If this position of the sensing element 28 is due to the fact that a flat can is being sensed, then the switch 23 at the same time is being closed by the tripping of the target device 25 by the peripheral wall of said can. The closing of both switches 22 and 23 at the same time energizes the solenoid 44 and operates the can ejector device 20 in the manner described, to eject the faulty can from the conveyor line. If, however, the dropping of the sensing element 28 to its lowermost position is due to the fact that no cans are being sensed, then the switch 23 will remain open and the can ejector device 20 will not operate. If the lifting of the sensing element 28 into position to close the switch 22 is caused by the action of the rim of the can as it passes by the sensing element, then this action does not operate the can ejector device 20, since the target device 25 is not being tripped into position to close the switch 23.

When a properly pressurized can 10 is being sensed by the element 28, this element will rise into the inductance coil 65 changing the inductance of the coil and thereby the resistance of the control relay circuit 60, and the resulting balance of resistances in said circuit will reduce or cut off flow of current to the coil of the relay 67 to the point where it is deenergized causing the switch 22 to open. Closing of the switch 23 by the target device 25, therefore, will not operate the can ejector device 25.

The same basic system that operates for pressurized cans can be made to operate for vacuumized cans. For that purpose, the switch 22 is a two way switch with a contact arm 75 operating between two contacts 76 and 77, and the circuit 21 has two lines 78 and 79 connected in parallel between the solenoid 44 and the switch 22, the line 78 being connected to the contact 76 and the line 79 being connected to the contact 77. The contact arm 75 is operated by the energization of the coil of the relay 67 against the action of a spring 80 into engagement with the contact 76 and is moved by said spring upon deenergization of said coil into engagement with the contact 77. A pair of switches 81 and 82 in the lines 78 and 79 respectively are manually operated so that when one switch is opened the other is closed, and vice versa. With manual operation, either line 78 or 79 may be selectively connected into the can ejecting circuit 21, according to whether it is desired to operate in accordance with pressurized cans or vacuumized cans. When operating with pressurized cans in the manner described, the switches 81 and 82 are manipulated to close the switch 81 and open the switch 82.

When it is desired to operate in connection with vacuumized cans, the switch 82 is closed and the switch 81 is opened. For operating on vacuumized cans, it might be necessary to adjust the resistance 64 and to adjust the height of the housing 27. With the system properly adjusted, the sensing element 28 will be in its lowermost position when the can being tested is properly vacuumized, and under these conditions, current will flow through the coil of the relay 67 causing said coil to be energized and the contact arm 75 to be pulled away from the contact 77 against the action of the spring 80, thereby opening the circuit through the line 79 and rendering the can ejector device inactive. When the can sensed is not properly vacuumized so that the top end wall is not properly depressed but is sufficiently raised to raise the sensing element into the inductance coil 65 sufficiently to balance the resistances in the control relay circuit 60, the coil in the relay 67 will be deenergized and this will cause the contact arm 75 to move under the action of the spring 80 into engagement with the contact 77 to close the circuit through the line 79. Under these conditions, the tripping of the target device 20 will close the switch 23 and close the circuit of the solenoid 44 causing the can to be ejected.

The apparatus of FIGS. 1-6 so far described, including the electrical system has the advantage of being accurate, of effecting quick response, of reducing the possibilities of shock to personnel and of obviating excess erosion of electrical contacts. However, as far as certain aspects of the invention are concerned, other electrical systems may be employed in connection with the mechanical features of the present invention. For example, instead of employing a ball contact for the target device, a photoelectric device with a delay circuit set in accordance with the speed of the cans can be employed to respond at the moment each can is on exact center with respect to the sensing device.

Also, instead of employing an inductance circuit to sense the difference between a properly pressurized or vacuumized can and one which has been properly treated pressurewise, the difference can be sensed for example, through a change in any one of the two other parameters of a circuit, namely capacitance and resistance. For example, in employing capacitance as the variable circuit parameter, a grounded capacitive plate in a capacitive circuit is lifted by a sensing element into the dielectric space between two stator plates to vary the capacitance of the circuit. The activation or deactivation of the relay controlling the switch 22 is made responsive to this change in capacitance.

In employing variations in the resistance of a circuit as the control factor in the operation of the switch 22, a resistance in the circuit may be varied by the movement of the sensing element controlling the current through a relay operating said switch.

Figures 6, 7:
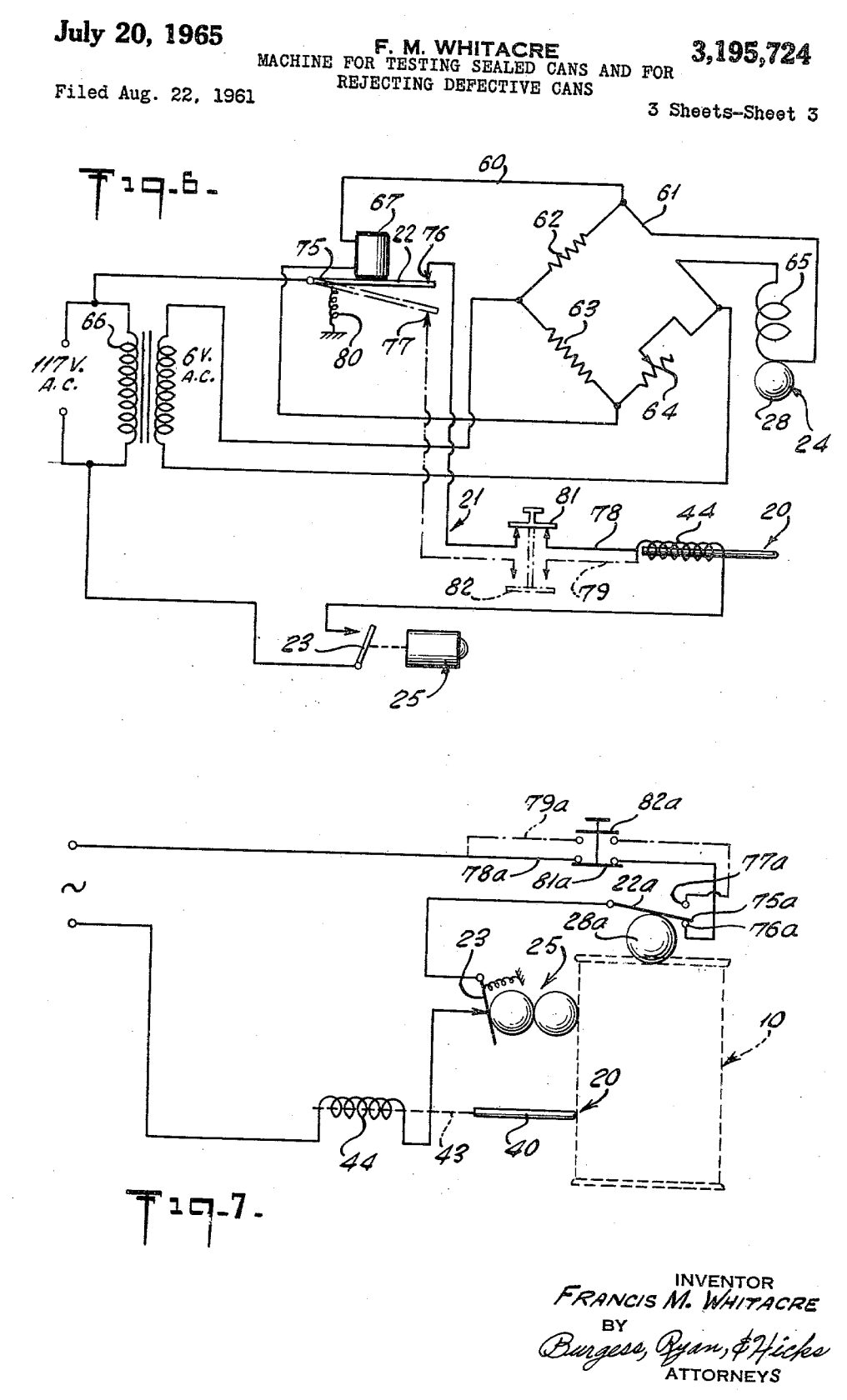

FIG. 7 shows an electrical system which has the virtue of simplicity and which in accordance with certain aspects of the present invention can be employed in place of the circuit of FIG. 6 described, although the circuitry of FIG. 6 is preferred because of its greater sensitivity, greater switch disability and lesser shock possibilities. In the simplified system of FIG. 7, the switch 22a corresponding to the switch 22 in the construction of FIGS. 1-6, is directly controlled from the sensing element 28a and consists of a contact arm 75a operating between two contacts 76a and 77a connected into two lines 78a and 79a joined into the circuit in parallel. Line 78a is cut into the circuit when the apparatus is to be employed for pressurized cans, and the other line 79a is cut into the circuit when the apparatus is to be employed for vacuumized cans. Switches 81a and 82a in the lines 78a and 79a respectively permit either of these lines to be connected into and out of the circuit.

As shown, the circuit of FIG. 7 is set up to operate on pressurized cans and to eject a faulty can pressurized below a prescribed limit. By opening switch 81a and closing switch 82a, the system can be employed for vacuumized cans.

While the invention has been described with particular reference to specific embodiments, it is to be understood that it is not to be limited thereto but is to be construed broadly and restricted solely by the scope of the appended claims.

What is claimed is:

1. A machine for testing sealed substantially cylindrical containers having respective flexible end walls flexed in accordance with internal pressures, comprising
    (a) conveyor means for moving the containers successively in line in a direction past a sensing station while supporting said containers in upright positions with said flexible end walls on top,
    (b) means for ejecting a container sideways from said line at said sensing station including an ejector plunger at said sensing station on one side of said direction of movement of said containers movable back and forth in a direction transversely of said direction of movement of said containers, said plunger being located in position to eject a container at said sensing station when said plunger is moved forth in said transverse direction, a circuit for controlling the powering of said plunger for operation including two switches in series in said circuit, and means for moving said plunger in a direction to eject a container at said sensing station from said line immediately and automatically upon the simultaneous closing of said switches,
    (c) means at said sensing station for sensing when the upper flexible end walls of said containers fail to flex in accordance with requirements as said containers move successively past said sensing station and for closing one of said switches when said sensing means senes the failure of a container to meet said requirements, said means for sensing the flexible end walls of said containers comprising a spherical sensing ball supported for gravitational movement at said sensing station into engagement with the flexible end walls of said containers as said containers move in said line, said ball being free of any spring pressure and being supported for free universal rotation and for translational movement up and down by the contours of said end walls, and
    (d) a second sensing means at said sensing station on said side of the direction of movement of said containers for sensing the peripheral wall of said containers at said sensing station and for closing the other switch when said second sensing means senses the presence of a container at said sensing station,
    (e) said two sensing means being located to sense simultaneously at said sensing station two parts of each container in a substantially central common plane substantially at right angles to said line of direction, and to close thereby said switches simultaneously when a sensed container has an end wall which fails to flex in accordance with requirements, whereby the plunger is powered to eject the latter container from said line of direction.

2. A machine as described in claim 1, said ejecting means comprising a solenoid in said circuit in series with said switches, said plunger being powered by said solenoid.

References Cited by the Examiner
UNITED STATES PATENTS

| | | | |
|---|---|---|---|
| 1,694,828 | 12/28 | McClatchie | 209—90 X |
| 2,338,868 | 1/44 | Owens | 209—82 |
| 2,634,859 | 4/53 | Jagen | 209—82 |
| 2,689,647 | 9/54 | Hofstetter | 209—90 |
| 2,936,071 | 5/60 | Fauth | 209—88 |
| 3,088,591 | 5/63 | Perthen | 209—88 |

FOREIGN PATENTS 925,251   3/47   France.

ROBERT B. REEVES, *Acting Primary Examiner.*

ROBERT C. RIORDON, ERNEST A. FALLER, JR.,
*Examiners.*